United States Patent [19]

Arthur

[11] 3,748,552

[45] July 24, 1973

[54] MOTOR CONTROL CIRCUIT FOR TAPE DRIVE

[75] Inventor: William C. Arthur, Boulder, Colo.

[73] Assignee: Storage Technology Corporation, Boulder, Colo.

[22] Filed: July 12, 1971

[21] Appl. No.: 161,480

[52] U.S. Cl. ........................ 318/7, 318/210, 318/373

[51] Int. Cl. ................................ H02p 3/20

[58] Field of Search .................... 318/6, 7, 373, 374, 318/210; 179/100.2; 328/207

[56] References Cited

UNITED STATES PATENTS 3,500,163 3/1970 Moritz ................................ 318/373

*Primary Examiner*—Gene Z. Rubinson

*Attorney*—Woodcock, Washburn et al.

[57] ABSTRACT

In a computer tape drive system, a fluctuating motor drive voltage is compared with a regulated voltage at the input to an operational amplifier to generate a voltage at the amplifier output for charging the coupling capacitor of a single-shot multivibrator. The single-shot period is then utilized to establish a motor drive period during which the motor drive voltage is applied to the motor. Since the single-shot period is inversely related to the voltage at the amplifier output and therefore inversely related to the motor drive voltage, any fluctuation in motor drive voltage is compensated for by a corresponding inverse change in the motor drive period.

5 Claims, 4 Drawing Figures

MOTOR CONTROL CIRCUIT FOR TAPE DRIVE

BACKGROUND OF THE INVENTION

This invention relates to the control of motor drive duration in a magnetic tape drive unit to compensate for fluctuations in the motor drive voltage.

In a high performance tape drive such as the IBM 2420 Model 5 computer magnetic tape unit described in that company's bulletin file no. S/360–05 form A3-2–0007–1, certain aspects of which are disclosed in U.S. Pat. No. 3,646,417 — Cassie et al., or the STC 2400 series of tape devices manufactured by the assignee of this invention, it is desirable to accurately control the amount of tape travel past the read/write head when stopping after either a write or read operation. This is required on a write operation by the desire to maintain short gaps (IBG) between records, the IBG being dependent both on tape travel during stop and tape travel during start where start is defined as acceleration from zero to read/write velocity. On a read operation the stop distance must be controlled so that on the next start, in either direction, the record is not reached until the tape is at read/write velocity.

To achieve accurate stop distances, it is common practice to reverse the drive to the capstan motor of the tape unit for rapid deceleration and then to dynamically brake the motor to a complete stop. The reversal of the drive to the capstan motor to achieve rapid deceleration is called plugging. The plug duration is controlled by an adjustable single-shot multivibrator where the adjustment is required to correct for initial tolerances in the system as well as the nominal voltage of the motor drive power supply.

In systems of this type, the motor drive voltage is provided by an unregulated power supply for cost reasons. As a result, a change in load or line voltage results in a change in the motor drive current applied during plugging. This in turn results in a change in the capstan motor deceleration. Of course, a change in the deceleration will vary the tap stop distance and such a variation is less than desirable in a high performance magnetic tape unit.

SUMMARY OF THE INVENTION

In accordance with one aspect of the invention, a motor drive power supply is continuously monitored and a motor drive period is varied inversely to the average motor drive voltage to compensate for fluctuations in the motor drive voltage. This may be accomplished by providing a voltage comparison means for determining the difference between the motor drive voltage and a constant voltage provided by an unregulated power supply. The output from the voltage comparison means is then utilized to control the motor drive period as determined by a timing means responsive to the output.

In accordance with another aspect of the invention, the timing means comprises a single-shot multivibrator having a quasi-stable state duration representing the motor drive period and the voltage comparison means comprises an operational amplifier. By providing a capacitive feedback means for the operational amplifier, the voltage gain may be rolled-off to prevent noise on the motor drive voltage from appearing at the operational amplifier output. By also providing a bias network at the operational amplifier input, a zero offset for the amplifier output voltage may be achieved if required.

In accordance with yet another aspect of the invention, the output from the single-shot multi-vibrator is utilized to control the motor drive period during plugging of a capstan motor in a magnetic tape drive unit. Thus, the period of time during which the decelerating motor drive voltage is applied to the capstan motor during plugging is inversely related to the average motor drive voltage level during motor drive. Consequently, changes in the tape stop distance for variations in the motor drive voltage are substantially eliminated.

DETAILED DESCRIPTION OF A PREFERRED EMBODIMENT

Figure 1:
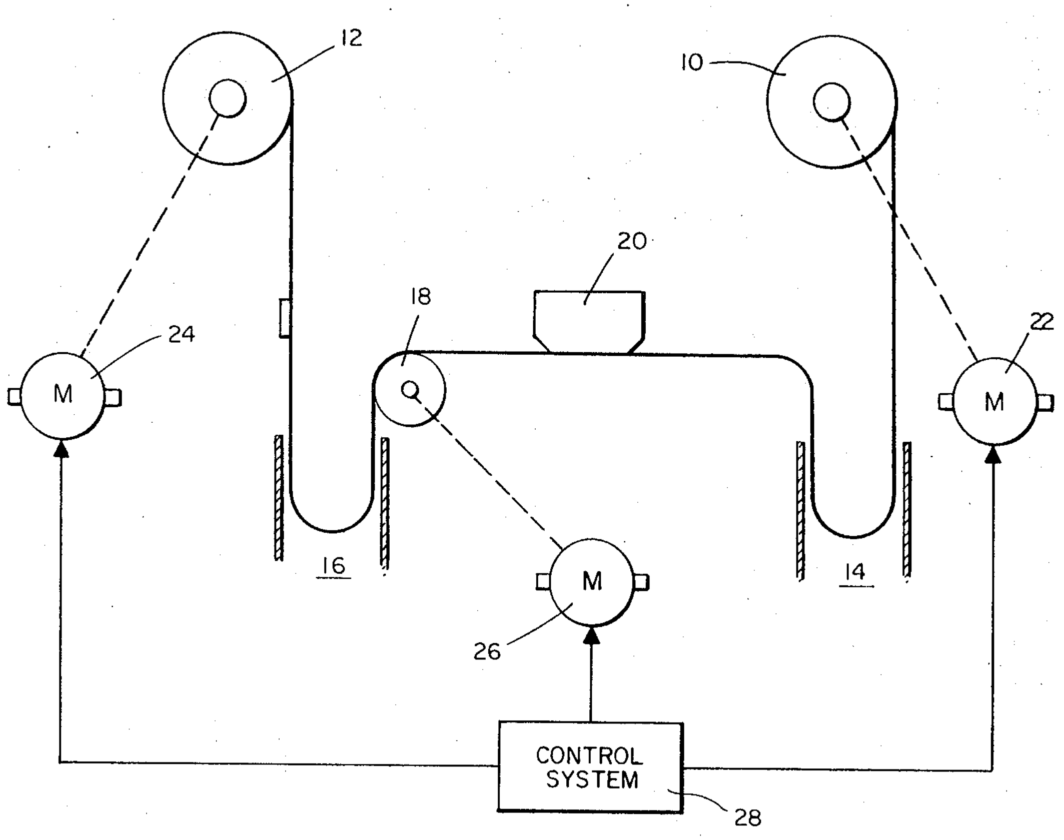
FIG. 1 is a schematic diagram representing certain components in a computer magnetic tape drive unit.

Referring to FIG. 1, a high performance computer magnetic tape recording and reproducing system includes a file reel 10 and a machine reel 12. As in conventional systems of this type, two vacuum columns 14 and 16 (partially shown) decouple the inertia of the magnetic tape from a single capstan 18 which drives the tape past magnetic heads. These heads include a read/write head 20 and an erase head not shown. The tape path between the file reel and the machine reel is formed in part by air bearing and guide members not shown.

The reels 10 and 12 as well as the capstan 18 are driven by motors 22, 24 and 26 respectively. A control system 28 is provided to control the direction, drive period and other variables for motors 22, 24 and 26. One of the control functions provided by the system 28 is the motor drive period associated with the plugging or application of a reverse drive voltage to the capstan 18 as will now be described with reference to FIG. 2.

Figure 2:
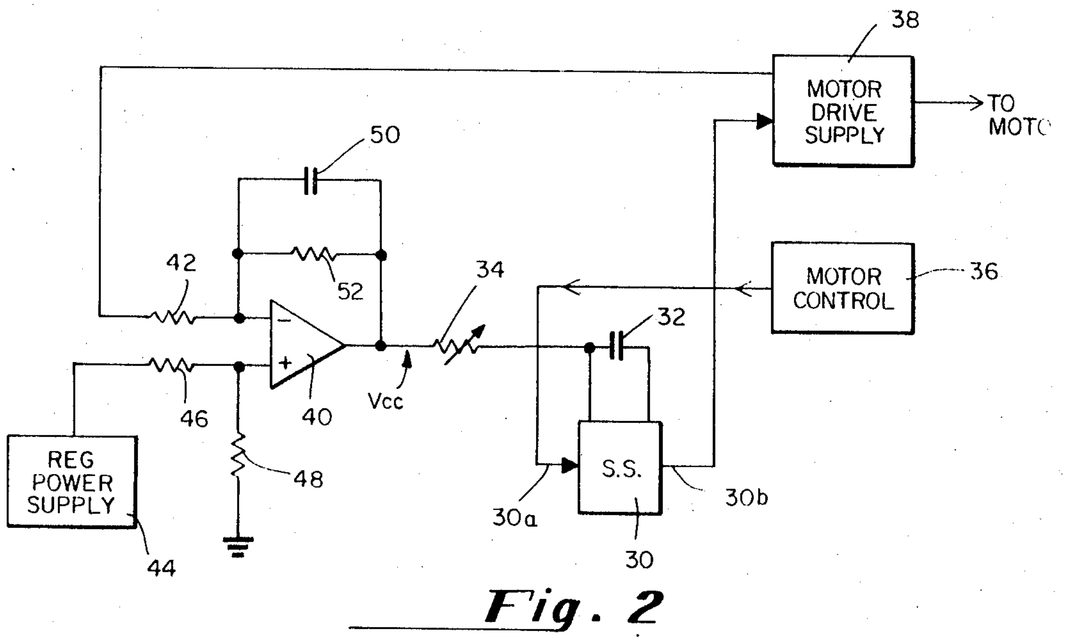
FIG. 2 is a schematic diagram of the plugging circuitry in the motor control system of FIG. 1.

The circuit of FIG. 2 which forms part of the control system 28 of FIG. 1 comprises a single-shot multivibrator 30 associated with a coupling capacitor 32 and a variable resistor 34. When a plugging or backward logic input from a motor control circuit 36, as described in the aforesaid U.S. Pat. No. 3,646,417, is applied to an input 30*a* of the single-shot 30, the circuit is triggered into a quasi-stable state during which the capacitor 32 is charged through the variable resistor 34. During this period, a logic signal at the output 30*b* of the single-shot 30 is applied to a plugging or backward input of a motor drive circuit 38, similar to that shown in FIGS. 5 and 7 of the aforesaid U.S. Pat. No. 3,646,417, for a motor drive period corresponding to the duration of the quasi-stable state. The motor drive voltage which is unregulated and can therefore fluctuate with the line voltage is then applied to the capstan motor 26 for plugging only during this period.

If the quasi-stable state were of constant duration as in the prior art, the motor drive voltage generated by the motor drive circuit 38 would be applied during the fixed motor drive period and the deceleration of the capstan 26 will vary with the unregulated motor drive voltage. However, in accordance with this invention, the duration of the quasi-stable state or the single-shot period is varied inversely with the motor drive voltage thereby compensating for changes therein.

This is accomplished by using the motor drive voltage from the motor drive circuit 38 to generate the voltage charging the capacitor 32 and thereby vary the single-shot period as an inverse function of the motor drive voltage. In this connection, the motor drive voltage is applied to a first input (−) of an operational amplifier 40 through an input resistor 42 and a substantially constant voltage from a regulated power supply 44 is applied to a second input (+) of the amplifier 40 through input resistors 46 and 48 which provide an appropriate zero offset for the amplifier output where one is required. The amplifier 40 compares the constant voltage and the motor drive voltage and generates an output voltage $V_{cc}$ representing the difference between the input voltages to the amplifier 40. The output voltage $V_{cc}$ is then used as the charging voltage for the capacitor 32. The gain of the amplifier 40 may be set to achieve desired tracking. Since the output voltage $V_{cc}$ varies directly, and linearly with the motor drive voltage since the amplifier 40 is linear, the single-shot period which varies inversely and linearly with the output voltage $V_{cc}$ will also vary inversely and linearly with the motor drive voltage.

In order to prevent noise on the motor drive voltage from appearing in the amplifier voltage $V_{cc}$ and thus prevent the single-shot 30 from firing in response to noise, a feedback capacitor 50 between the output and the first input is provided to roll-off the voltage gain. The feedback resistor 52 which is in parallel with the capacitor 50 is utilized to set the amplifier gain to achieve the desired tracking. The variable resistor 34 in the single-shot circuit corrects for initial tolerances in the system as well as appropriate adjustments for the nominal motor drive voltage level utilized.

Figure 3:
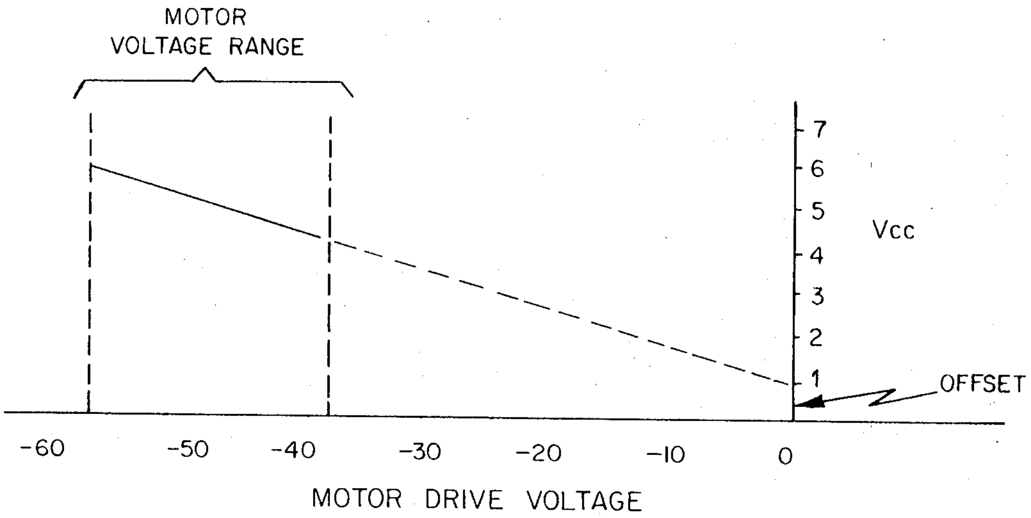
FIG. 3 is a graph illustrating the relationship between motor drive voltage and the output voltage at the amplifier in FIG. 2.
Figure 4:
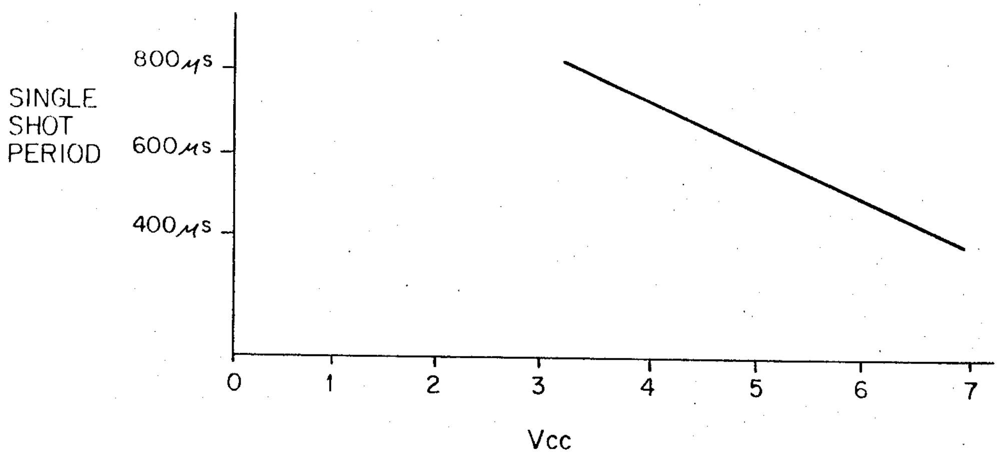
FIG. 4 is a graph illustrating the relationship between the period of the single-shot multivibrator and the amplifier output voltage in FIG. 2.

FIG. 3 shows the direct and linear relationship between the output voltage $V_{cc}$ and the motor drive voltage for a negative motor drive power supply 38. The relationship between the output voltage $V_{cc}$ in the motor drive voltage range and the single-shot period are shown in FIG. 4. In this case, the relationship is linear but inverse.

It has been found that the compensation provided by the circuit of FIG. 2 will permit a 20 per cent variation in line voltage both above and below the nominal voltage with substantially no noticeable change in the stop distance of the tape. Without the circuit of FIG. 2, a ± 15 per cent variation in the stop distance was observed.

The following components may be utilized in the circuit of FIG. 2:

S.S. 30 — MC951; and

Op. Amp. 40 — MA741C.

It will of course be understood that the regulated supply 44 and the bias network including resistors 44 and 46 may be eliminated where no zero offset is required. In such a case, the constant voltage applied to the second input of the amplifier 40 is provided by a ground connection. It will also be understood that the regulated supply 44 need only provide a few milli-amps of current as contrasted with the 30 – 45 amps required of a prior art regulated supply connected directly to the capstan motor. It is of course far more expensive to regulate a supply of large current capabilities than the supply 44.

Although the invention has been described in terms of compensation for a single-shot multivibrator of a computer tape drive, it will be understood that the circuit has a number of other applications related and unrelated to motor control.

Therefore, although a particular embodiment has been illustrated and described, it will be understood that various modifications may be made without departing from the scope and spirit of the invention as set forth in the appended claims.

What is claimed is:

1. A magnetic head, a capstan for driving tape past said magnetic head, a capstan motor for driving said capstan and a single-shot multivibrator having a quasi-stable state duration determining the period during which a reverse drive is applied to said capstan motor for deceleration, the improvement comprising means for changing the duration of said quasi-stable state inversely with changes in motor drive voltage comprising:

a regulated power supply providing a substantially constant voltage;

an unregulated power supply providing said motor drive voltage; and a voltage comparison means having a first input, a second input and an output, said unregulated power suppy being coupled to said first input so as to apply said motor drive voltage thereto and said regulated power supply being coupled to said second input so as to apply said substantially constant voltage thereto to generate a voltage at said output directly related to the difference between said drive voltage and said constant voltage, said output being coupled to said multivibrator for biasing in a manner so as to vary said quasi-stable state duration inversely with respect to the variations in said motor drive voltage.

2. The system of claim 1 wherein said voltage comparison means comprises an operational amplifier.

3. The system of claim 2 further comprising a feedback capacitance means for said amplifier to roll-off the voltage gain of said amplifier thereby preventing noise on said motor drive voltage from appearing at the output of said amplifier.

4. The system of claim 3 wherein said output voltage of said amplifier is directly and substantially linearly related to said motor drive voltage and the duration of said quasi-stable state is inversely and substantially linearly related to said motor drive voltage.

5. The system of claim 4 further comprising a bias network connected between said amplifier and said regulated power supply to provide a zero off-set for said output voltage of said amplifier.

* * * * *